US012609624B2

(12) United States Patent
Ji et al.

(10) Patent No.: US 12,609,624 B2
(45) Date of Patent: Apr. 21, 2026

(54) HIGH-EFFICIENCY PHASE SHIFT FULL-BRIDGE CONVERTER

(71) Applicant: SOLUM CO., LTD., Gyeonggi-do (KR)

(72) Inventors: Sang Keun Ji, Gyeonggi-do (KR); Jae Eun Kim, Seoul (KR); Dong Kyun Ryu, Seoul (KR)

(73) Assignee: SOLUM CO., LTD., Gyeonggi-do (KR)

( * ) Notice: Subject to any disclaimer, the term of this patent is extended or adjusted under 35 U.S.C. 154(b) by 136 days.

(21) Appl. No.: 18/217,515

(22) Filed: Jun. 30, 2023

(65) Prior Publication Data

US 2024/0007006 A1 Jan. 4, 2024

(30) Foreign Application Priority Data

Jul. 1, 2022 (KR) ........................ 10-2022-0081073

(51) Int. Cl.
| | |
|---|---|
| *H02M 3/335* | (2006.01) |
| *H02M 1/00* | (2006.01) |
| *H02M 3/00* | (2006.01) |

(52) U.S. Cl.
CPC ..... *H02M 3/33573* (2021.05); *H02M 1/0048* (2021.05); *H02M 3/01* (2021.05); *H02M 3/33576* (2013.01)

(58) Field of Classification Search
CPC .. H02M 3/33573; H02M 3/01; H02M 1/0048; H02M 3/33576; H02M 1/0058
See application file for complete search history.

(56) References Cited

U.S. PATENT DOCUMENTS 6,016,258 A * 1/2000 Jain ........................ H02M 1/38
363/17
8,035,996 B1 10/2011 Greenfeld
(Continued)

FOREIGN PATENT DOCUMENTS

| | | |
|---|---|---|
| JP | 2014-176226 | 9/2014 |
| JP | 5692166 | 4/2015 |

(Continued)

OTHER PUBLICATIONS

C.Y. Lim, Y. Jeong and G.W. Moon, "Phase-Shifted Full-Bridge DC-DC Converter With High Efficiency and High Power Density Using Center-Tapped Clamp Circuit for Battery Charging in Electric Vehicles," in IEEE Transactions on Power Electronics, vol. 34, No. 11, pp. 10945-10959, Nov. 2019, doi: 10.1109/TPEL.2019. 2899960.

(Continued)

*Primary Examiner* — Alex Torres-Rivera
(74) *Attorney, Agent, or Firm* — WOMBLE BOND DICKINSON (US) LLP

(57) ABSTRACT

A phase shift full bridge (PSFB) converter includes a switch portion including first to fourth switches connected in a form of a full bridge, a transformer configured to convert the output of the switch portion, a rectifying portion including at least one of a switch and a diode and configured to rectify the output of the transformer, a resonance inductor having an end connected to another end of a primary portion of the transformer and another end connected to a node between the third switch and the fourth switch, a first clamp diode having an end connected to an end of the first switch and another end connected to the other end of the primary portion of the transformer, and a second clamp diode having an end connected to the other end of the primary portion of (Continued)

the transformer and another end connected to another end of the second switch.

3 Claims, 9 Drawing Sheets

(56)             References Cited

U.S. PATENT DOCUMENTS

| | | | |
|---|---|---|---|
| 8,634,209 B2 | 1/2014 | Moiseev | |
| 2011/0273909 A1* | 11/2011 | Christopher | ........ H02M 3/3376 |
| | | | 363/17 |
| 2017/0346409 A1 | 11/2017 | Horii et al. | |
| 2021/0376741 A1* | 12/2021 | Escudero Rodriguez | ................... |
| | | | H02M 3/33573 |

FOREIGN PATENT DOCUMENTS

| | | |
|---|---|---|
| JP | 6372607 | 8/2018 |
| KR | 10-2010-0114839 | 10/2010 |
| KR | 10-2011-0064605 | 6/2011 |
| KR | 10-2018-0004675 | 1/2018 |

OTHER PUBLICATIONS

Office Action dated Feb. 6, 2024 for Korean Patent Application No. 10-2022-0081073 and its English translation from Global Dossier.

* cited by examiner

HIGH-EFFICIENCY PHASE SHIFT FULL-BRIDGE CONVERTER

CROSS-REFERENCE TO RELATED APPLICATION

This application is based on and claims priority under 35 U.S.C. § 119 to Korean Patent Application No. 10-2022-0081073, filed on Jul. 1, 2022, in the Korean Intellectual Property Office, the disclosure of which is incorporated by reference herein in its entirety.

BACKGROUND

1. Field

The disclosure relates to a phase shift full bridge converter, and more particularly, to a high-efficiency phase shift full bridge converter capable of reducing the power loss of a clamp diode.

2. Description of the Related Art

As an era of metaverse has arrived since 2020s, all of the interactions on the platform has had to be graphically processed, and thus, high-speed processing of a large volume of data has become a prerequisite. According to this, power consumption of the Internet data center has enormously increased, and it has become inevitable to minimize the power consumption of a server system. In order to reduce the power consumption of the server system, it is essential to develop a high-efficiency power supply unit, and it is necessary to compensate for an unnecessary power loss of a topology of a phase shift full bridge (PSFB) converter which is currently applied to the power supply unit.

FIG. 1 illustrates a PSFB converter according to the related art.

As illustrated in FIG. 1, the PSFB converter according to the related art may be divided into a primary portion and a secondary portion with respect to a transformer, and the primary portion may include an input voltage source Vin, a full bridge portion including first to fourth switches Q1 to Q4 and connected to the input voltage source Vin, a primary portion 11 of the transformer having an end connected between the first and second switches Q1 and Q2, and a resonance inductor Lr having an end connected to the other end of the transformer and the other end connected between the third and fourths switches Q3 and Q4. The secondary portion of the PSFB converter according to the related art may include a secondary portion of the transformer and a diode, and the secondary portion of the transformer may include a secondary-side first coil 21 and a secondary-side second coil 22.

According to the PSFB converter according to the related art illustrated in FIG. 1, the diode has an increased peak voltage, due to a resonance between the resonance inductor Lr and a parasitic capacitor of the diode of the secondary portion. Thus, it is required to increase the voltage specifications of the diode arranged in the secondary portion, which may decrease economic feasibility and efficiency.

SUMMARY

Provided is a high-efficiency phase shift full bridge (PSFB) converter having increased efficiency compared to a PSFB converter according to the related art.

Additional aspects will be set forth in part in the description which follows and, in part, will be apparent from the description, or may be learned by practice of the presented embodiments of the disclosure.

According to an aspect of the disclosure, a phase shift full bridge (PSFB) converter includes a switch portion including first to fourth switches connected in a form of a full bridge, the switch portion being configured to receive a direct current input and output an alternating current output, a transformer configured to convert the output of the switch portion, an end of a primary portion of the transformer being connected to a node between the first switch and the second switch, a rectifying portion including at least one of a switch and a diode connected to an output end of the transformer, the rectifying portion being configured to rectify the output of the transformer, a resonance inductor having an end connected to another end of the primary portion of the transformer and another end connected to a node between the third switch and the fourth switch, a first clamp diode having an end connected to an end of the first switch and another end connected to the other end of the primary portion of the transformer, and a second clamp diode having an end connected to the other end of the primary portion of the transformer and another end connected to another end of the second switch.

The PSFB converter may further include at least one of a first auxiliary capacitor connected to the first switch in parallel and a second auxiliary capacitor connected to the second switch in parallel.

The PSFB converter may further include the first auxiliary capacitor. Also, the transformer may include a secondary-side first coil and a secondary-side second coil, and the rectifying portion may include a first diode having an end connected to an end of the secondary-side first coil, a second diode having an end connected to another end of the secondary-side second coil and another end connected to another end of the first diode, an output inductor having an end connected between the secondary-side first coil and the secondary-side second coil, and an output capacitor having an end connected to another end of the output inductor and another end connected to another end of the second diode.

The PSFB converter may further include the second auxiliary capacitor. Also, the rectifying portion may include first to fourth diodes arranged in a form of a full bridge, the transformer may include a secondary-side coil having an end connected between the first diode and the second diode and another end connected between the third diode and the fourth diode, and the rectifying portion may further include an output inductor having an end connected to an end of the first diode and an end of the third diode and an output capacitor having an end connected to another end of the output inductor and another end connected to another end of the second diode and another end of the fourth diode.

The PSFB converter may further include the first auxiliary capacitor and the second auxiliary capacitor. Also, the transformer may include a secondary-side coil, and the rectifying portion may include an inductor portion connected to the secondary-side coil in parallel and including a first output inductor and a second output inductor connected to each other in series, a first diode having an end connected to an end of the first output inductor, a second diode having an end connected to another end of the second output inductor and another end connected to another end of the first diode, and an output capacitor having an end connected to the other end of the first diode and another end connected between the first output inductor and the second output inductor.

The PSFB converter may further include the first auxiliary capacitor and the second auxiliary capacitor. Also, the transformer may include a secondary-side first coil and a secondary-side second coil, and the rectifying portion may include a first rectifying switch having an end connected to an end of the secondary-side first coil, a second rectifying switch having an end connected to another end of the secondary-side second coil and another end connected to another end of the first rectifying switch, an output inductor having an end connected to a node between the secondary-side first coil and the secondary-side second coil, and an output capacitor having an end connected to another end of the output inductor and another end connected to the other end of the second rectifying switch.

The transformer may include a primary-side coil and a resonance capacitor arranged between the primary-side coil and a node between the first switch and the second switch.

The PSFB converter may further include the second auxiliary capacitor. Also, the rectifying portion may include first to fourth rectifying switches arranged in a form of a full bridge, the transformer may include a secondary-side coil having an end connected between the first rectifying switch and the second rectifying switch and another end connected between the third rectifying switch and the fourth rectifying switch, and the rectifying portion may further include an output inductor having an end connected to an end of the first rectifying switch and an end of the third rectifying switch and an output capacitor having an end connected to another end of the output inductor and another end connected to another end of the second rectifying switch and another end of the fourth rectifying switch.

The transformer may include a primary-side coil and a resonance capacitor arranged between the primary-side coil and a node between the first switch and the second switch.

The PSFB converter may further include the first auxiliary capacitor. Also, the transformer may include a secondary-side coil, and the rectifying portion may include an inductor portion connected to the secondary-side coil in parallel and including a first output inductor and a second output inductor connected to each other in series, a first rectifying switch having an end connected to an end of the first output inductor, a second rectifying switch having an end connected to another end of the second output inductor and another end connected to another end of the first rectifying switch, and an output capacitor having an end connected to the other end of the first rectifying switch and another end connected between the first output inductor and the second output inductor.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
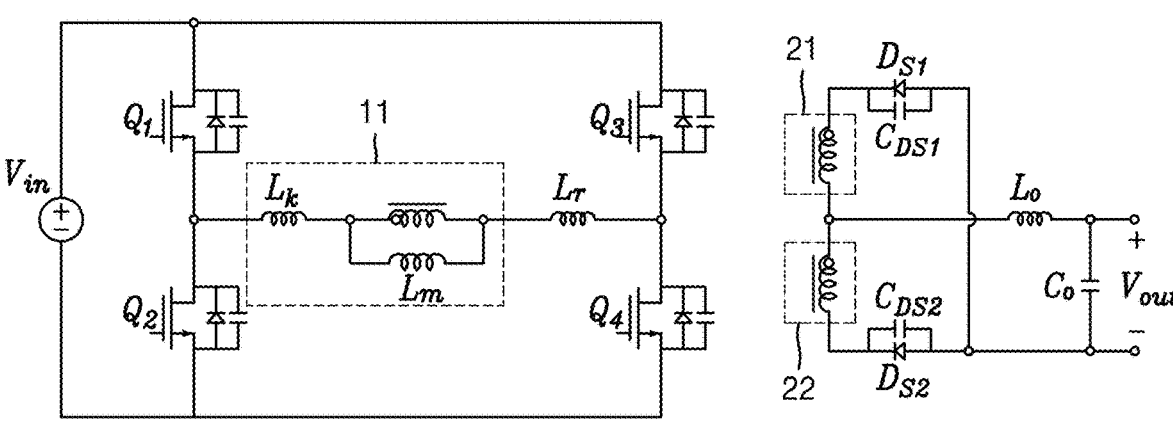
FIG. 1 is a circuit diagram of a phase shift full bridge (PSFB) converter according to the related art.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

In the embodiments, general terms that have been widely used nowadays are selected, when possible, in consideration of functions of the disclosure, but non-general terms may be selected according to the intentions of technicians in the this art, precedents, or new technologies, etc. Also, some terms may be arbitrarily chosen by the present applicant. In this case, the meanings of these terms will be explained in corresponding parts of the disclosure in detail. Thus, the terms used herein should be defined not based on the names thereof but based on the meanings thereof and content throughout the disclosure.

Throughout the disclosure, it will be understood that when an element is referred to as "including" an element, the element may further include another element, rather than excluding the other element, unless mentioned otherwise. Also, the terms, such as "unit" or "module," used in the disclosure, should be understood as a unit that processes at least one function or operation and that may be embodied in a hardware manner, a software manner, or a combination of the hardware manner and the software manner.

As used in this specification, expressions such as "the at least one of," etc. are described before arranged components, the expressions modify all of the arranged components, rather than each of the components. For example, the expression "at least one of a, b, and c" shall be interpreted to include "a, b, c," "a and b," "a and c," "b and c," or "a, b, and c."

Hereinafter, embodiments of the disclosure will be described in detail with reference to the accompanying drawings, so that the embodiments of the disclosure may be easily implemented by one of ordinary skill in the art.

Hereinafter, a high-efficiency phase shift full bridge (PSFB) converter according to various embodiments is described in detail with reference to the accompanying drawings. Hereinafter, with respect to the components of the disclosure, a side denotes an upper side and/or a left side, and the other side denotes a lower side and/or a right side.

Figure 2:
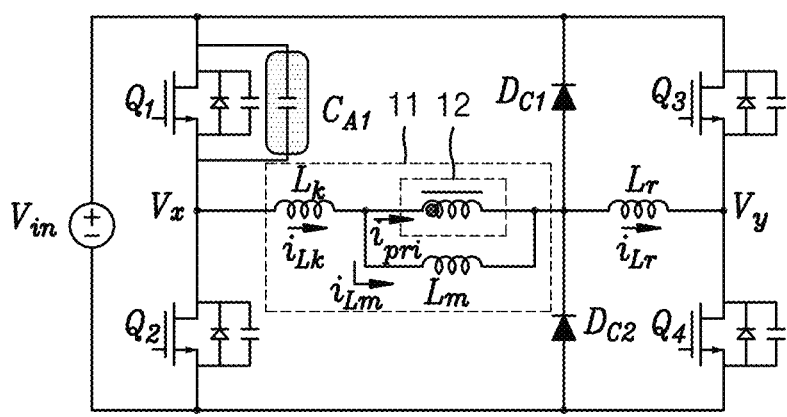
FIG. 2 is a circuit diagram of a high-efficiency PSFB converter according to an embodiment.
Figure 2:
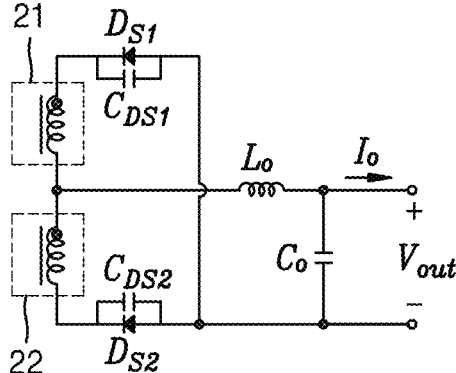

FIG. 2 is a circuit diagram of a high-efficiency PSFB converter according to an embodiment.

As illustrated in FIG. 2, the high-efficiency PSFB according to the embodiment may include a switch portion, a transformer, a resonance inductor $L_r$, a rectifying portion, a first clamp diode $D_{C1}$, a second clamp diode $D_{C2}$, and a first auxiliary capacitor $C_{A1}$.

The switch portion may receive a direct current input from an input voltage source $V_{in}$ and output an alternating current output. The switch portion may include a first switch $Q_1$ to a fourth switch $Q_4$ connected as a full bridge form. For example, the switch portion may include a leading leg and a lagging led, and the first and second switches $Q_1$ and $Q_2$ may be connected to the leading lag in series, and the third and fourth switches $Q_3$ and $Q_4$ may be connected to the lagging leg in series. The leading lag, that is, the first and second switches $Q_1$ and $Q_2$ may be arranged close to the input voltage source $V_{in}$, and the lagging leg may be arranged far from the input voltage source $V_{in}$. Each of the first to fourth switches $Q_1$ to $Q_4$ included in the switch portion may operate based on a phase shift method. Also, each of the first to fourth switches $Q_1$ to $Q_4$ included in the switch portion may include a diode and a parasitic capacitor connected in parallel as illustrated in FIG. 2.

The transformer may convert the output of the switch portion. For example, the transformer may convert a magnitude of a voltage input from the switch portion and output the converted voltage. A portion of the transformer, the portion being connected to the switch portion, may be a primary portion 11 of the transformer, and a portion of the transformer, the portion being configured to transform and output the output of the switch portion, may be a secondary portion of the transformer. The primary portion 11 of the transformer may have an end connected to a node between the first switch $Q_1$ and the second switch $Q_2$ and the other end connected to an end of the resonance inductor $L_r$. The other end of the resonance inductor $L_r$ may be connected to a node between the third switch $Q_3$ and the fourth switch $Q_4$. The transformer may include a first inductor $L_k$ and a primary-side coil 12 arranged in the primary portion of the transformer. The primary-side coil 12 may include mutual inductance $L_m$, and as illustrated in FIG. 2, the mutual inductance $L_m$ may be indicated as being connected to the primary-side coil 12 in parallel.

The rectifying portion may be connected to an output portion of the transformer, that is, the secondary portion, and may rectify the output of the transformer. The transformer may include a secondary-side first coil 21 and a secondary-side second coil 22 arranged in the secondary portion. The secondary-side first coil 21 and the secondary-side second coil 22 may be connected to each other in series.

In this disclosure, the rectifying portion may include at least one of a switch and a diode, and the rectifying portion of the high-efficiency PSFB converter according to the embodiment may include a diode instead of a switch. For example, the rectifying portion according to the present embodiment may include a first diode $D_{S1}$, a second diode $D_{S2}$, an output inductor $L_O$ and an output capacitor $C_O$.

An end of the first diode $D_{S1}$ may be connected to an end of the secondary-side first coil 21.

An end of the second diode $D_{S2}$ may be connected to the other end of the secondary-side second coil 22, and the other end of the second diode $D_{S2}$ may be connected to the other end of the first diode $D_{S1}$.

Each of the first diode $D_{S1}$ and the second diode $D_{S2}$ may have a parasitic capacitance, and these parasitic capacitances may be indicated as a first capacitor $C_{DS1}$ and a second capacitor $C_{DS2}$ respectively connected in parallel to the first diode $D_{S1}$ and the second diode $D_{S2}$.

An end of the output inductor $L_O$ may be connected between the secondary-side first coil 21 and the secondary-side second coil 22. Also, an end of the output capacitor $C_O$ may be connected to the other end of the output inductor $L_O$, and the other end of the output capacitor $C_O$ may be connected to the other end of the second diode $D_{S2}$. The both ends of the output capacitor $C_O$ may be connected to an output end or may be the output end.

The first clamp diode $D_{C1}$ may be connected to the primary portion 11 of the transformer, and in more detail, an end of the first clamp diode $D_{C1}$ may be connected to an end of the first switch $Q_1$ and an end of the third switch $Q_3$, and the other end of the first clamp diode $D_{C1}$ may be connected to the other end of the primary portion 11 of the transformer. An end of the second clamp diode $D_{C2}$ may be connected between the other end of the primary portion 11 of the transformer and an end of the resonance inductor $L_r$, and the other end of the second clamp diode $D_{C2}$ may be connected to the other end of the second switch $Q_2$ and the other end of the fourth switch $Q_4$.

The first auxiliary capacitor $C_{A1}$ may be connected to the first switch $Q_1$ in parallel. For example, an end of the first auxiliary capacitor $C_{A1}$ may be connected to a plus end of the input voltage source $V_{in}$, and the other end of the first auxiliary capacitor $C_{A1}$ may be connected to a node between the first switch $Q_1$ and the second switch $Q_2$.

Figure 3:
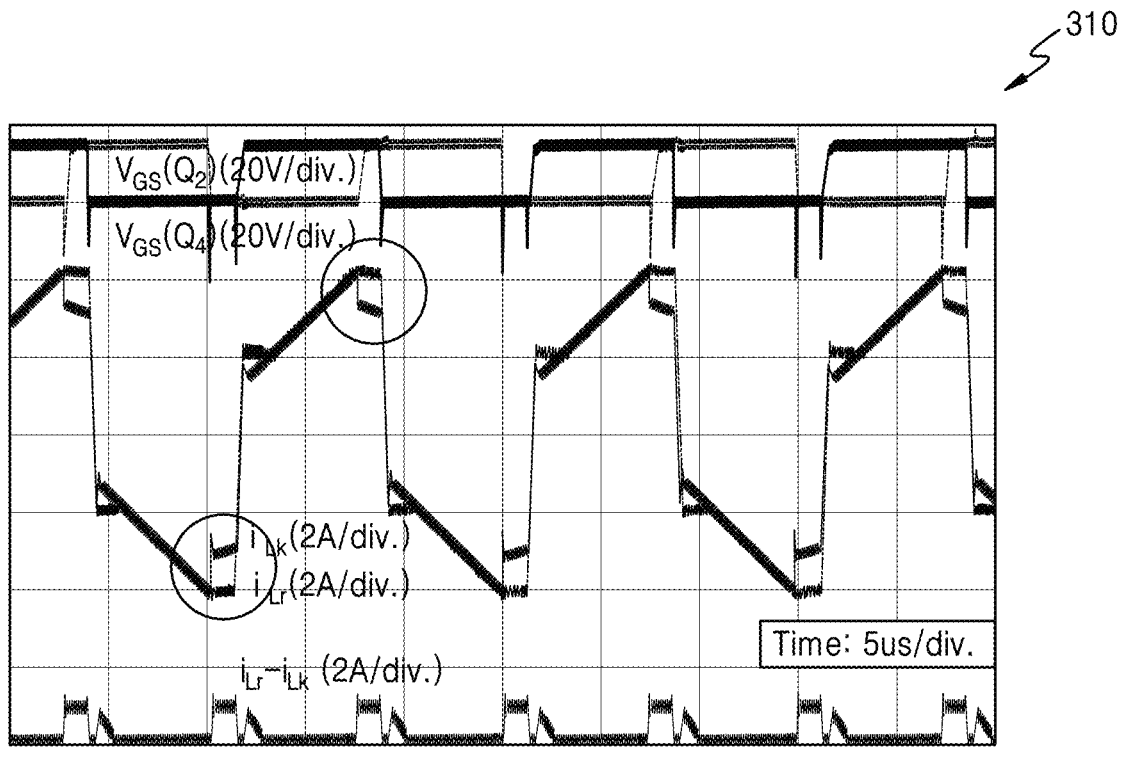
FIG. 3 is a graph showing comparison of currents flowing in a first inductor and a resonance inductor according to whether or not a first auxiliary capacitor is provided.
Figure 3:
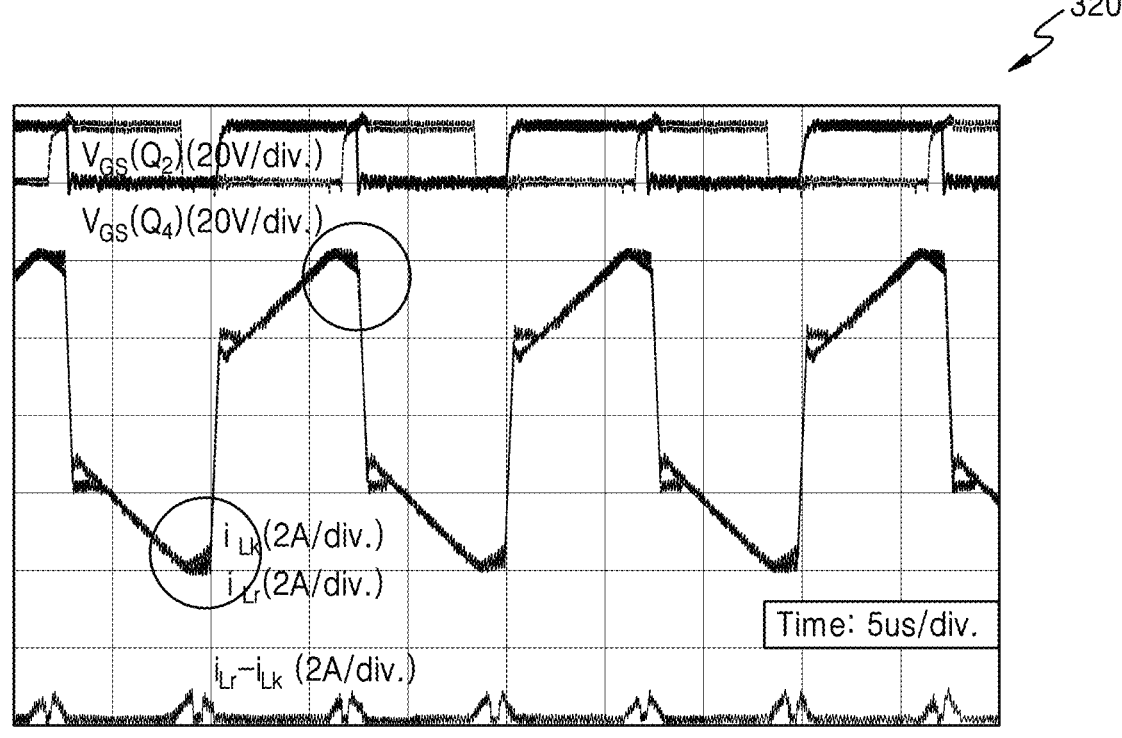

FIG. 3 is a graph showing comparison of currents flowing in the first inductor and the resonance inductor according to whether or not the first auxiliary capacitor is provided. A graph 310 shows a case where the first auxiliary capacitor is not provided, and a graph 320 shows a case where the first auxiliary capacitor is provided.

The PSFB converter may have a greatly increased peak voltage of the first diode $D_{S1}$ and the second diode $D_{S2}$ due to a resonance between the resonance inductor $L_r$, the first capacitor $C_{DS1}$, and the second capacitor $C_{DS2}$. To solve this problem, the PSFB converter according to the embodiment may include the first clamp diode $D_{C1}$ and the second clamp diode $D_{C2}$. However, when the first clamp diode $D_{C1}$ and the second clamp diode $D_{C2}$ are additionally provided, a magnitude of $i_{Lr}$, a current flowing in the resonance inductor $L_r$ in a freewheeling section, is increased, and a current corresponding to a value obtained by subtracting $i_{Lk}$, a current flowing in the first inductor $L_k$, from $i_{Lr}$, the current flowing in the resonance inductor $L_r$, flows through the first clamp diode $D_{C1}$ and the second clamp diode $D_{C2}$, and thus, loss may occur to the first clamp diode $D_{C1}$ and the second clamp diode $D_{C2}$, and the efficiency may be decreased. This is because in the freewheeling section, due to electrical connection between the first clamp diode $D_{C1}$ and the second clamp diode $D_{C2}$, an inverse voltage may not be applied to the resonance inductor $L_r$, and a voltage of 0 may be applied, and thus, the current may not be reduced and may be maintained. Here, the freewheeling section may be a section in which both of the first and second switches $Q_1$ and $Q_2$ are turned on or off.

According to the disclosure, in order to solve the problem described above, by adding the first auxiliary capacitor $C_{A1}$, in the freewheeling section, voltage of both ends of the leading lag in which the first and second switches $Q_1$ and $Q_2$ are arranged may have a decreased inclination. Thus, a voltage of both ends of the first inductor $L_k$ may not be drastically changed, and thus, by limiting the reduction of $L_k$ the current flowing in the first inductor $L_k$ and maintaining the current, a difference between $i_{Lr}$ and $i_{Lk}$ may be reduced, to reduce the currents flowing in the first clamp diode $D_{C1}$ and the second clamp diode $D_{C2}$.

Figure 4:
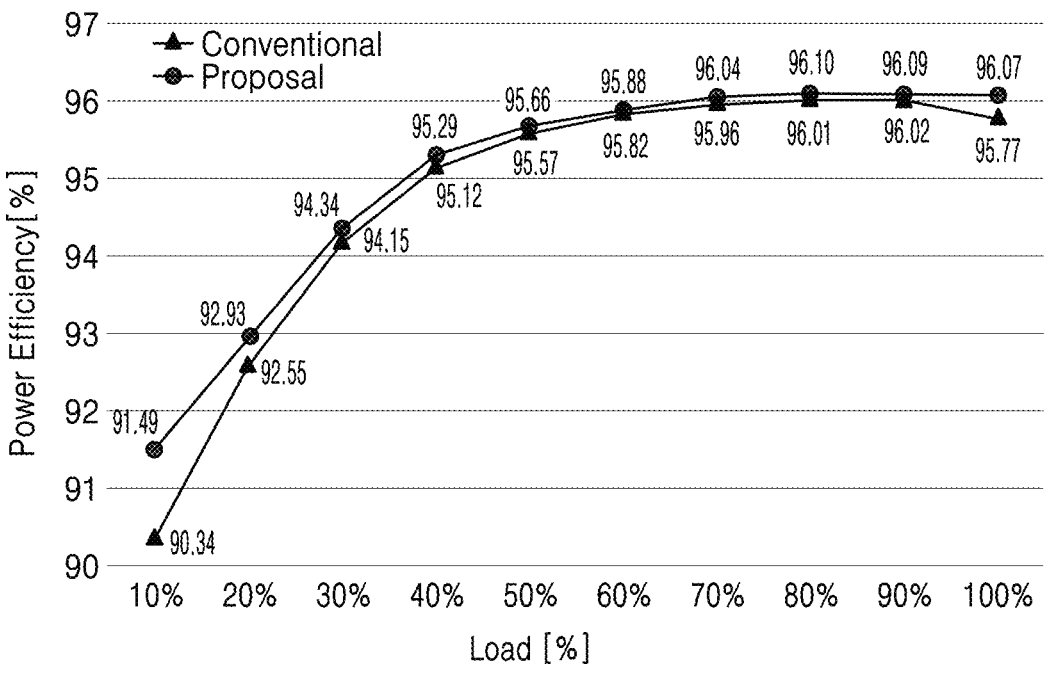
FIG. 4 is a graph showing comparison of the power efficiency between the PSFB converter according to the embodiment and the PSFB converter according to the related art.

FIG. 4 is a graph showing comparison of the power efficiency between the PSFB converter according to the embodiment and the PSFB converter according to the related art.

In FIG. 4, a vertical axis denotes power efficiency, a horizontal axis denotes a load, a graph of triangular points indicates the PSFB converter according to the related art, and a graph of circular points indicates the PSFB converter according to the embodiment.

Referring to FIG. 4, according to the present embodiment, compared to the PSFB converter according to the related art that has no auxiliary capacitor, the power efficiency is increased by 0.3% at the load of 100%, and about 1.15% of a maximum increase of the power efficiency is possible according to a load.

Figure 5:
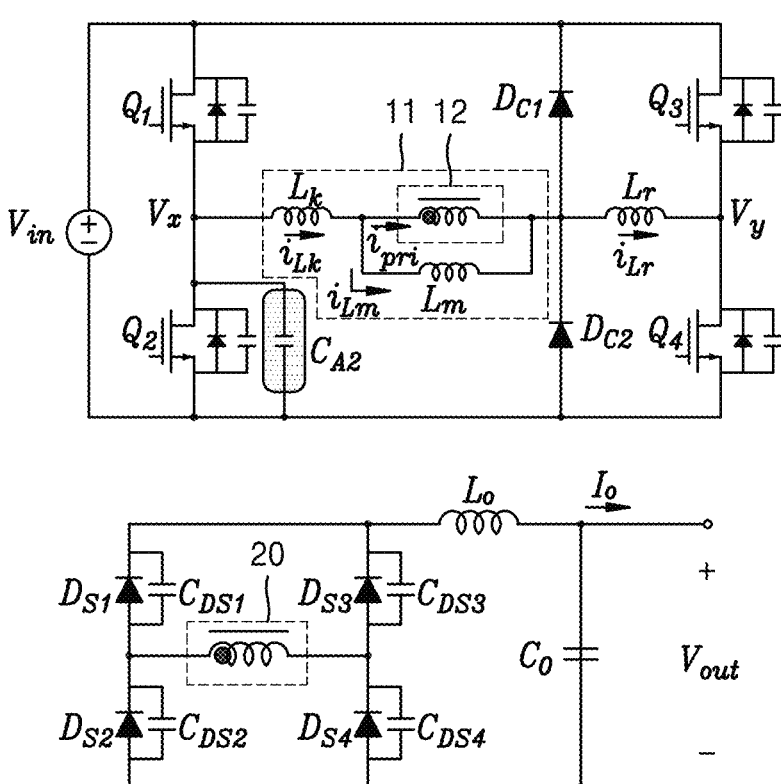
FIG. 5 is a circuit diagram of a PSFB converter according to another embodiment.

FIG. 5 is a circuit diagram of a PSFB converter according to another embodiment.

As illustrated in FIG. 5, except that the PSFB converter according to the another embodiment may include, in the primary portion 11 of the transformer, a second auxiliary capacitor $C_{A2}$ connected to the second switch $Q_2$ in parallel, rather than the first auxiliary capacitor $C_{A1}$, the PSFB converter according to the another embodiment may have the same circuital structure of the primary portion 11 of the transformer as the PSFB converter according to the embodiment shown in FIG. 2, and may have a different circuit of the secondary portion of the transformer from the PSFB converter according to the embodiment shown in FIG. 2.

As illustrated in FIG. 5, the transformer of the PSFB converter according to the another embodiment may include a secondary-side coil 20, and the PSFB converter may include the rectifying portion including first to fourth diodes $D_{S1}$ to $D_{S4}$, an output inductor $L_O$, and an output capacitor $C_O$.

The first to fourth diodes $D_{S1}$ to $D_{S4}$ included in the rectifying portion may be arranged as a full bridge form, and the secondary-side coil 20 of the transformer may have an end connected between the first diode $D_{S1}$ and the second diode $D_{S2}$ and the other end connected between the third diode $D_{S3}$ and the fourth diode $D_{S4}$. Each of the third diode $D_{S3}$ and the fourth diode $D_{S4}$ may include a parasitic capacitor like the first and second diodes $D_{S1}$ and $D_{S2}$ described according to the embodiment, and the parasitic capacitors of the third diode $D_{S3}$ and the fourth diode $D_{S4}$ may be respectively referred to as a third capacitor $C_{DS3}$ and a fourth capacitor $C_{DS4}$.

An end of the output inductor $L_O$ may be connected to an end of the first diode $D_{S1}$ and an end of the third diode $D_{S3}$. An end of the output capacitor $C_O$ may be connected to the other end of the output inductor $L_O$, and the other end of the output capacitor $C_O$ may be connected to the other end of the second diode $D_{S2}$ and the other end of the fourth diode $D_{S4}$.

Compared with the PSFB converter according to the embodiment described above, the PSFB converter according to the another embodiment illustrated in FIG. 5 may include the second auxiliary capacitor $C_{A2}$, rather than the first auxiliary capacitor $C_{A1}$, and may have different structures of the secondary portion of the transformer and the rectifying portion. However, although there are these circuital difference, the effect of the PSFB converter according to the embodiment, that is, reduction of the magnitude of the current flowing toward the first clamp diode $D_{C1}$ and the second clamp diode $D_{C2}$, may be realized, through the second auxiliary capacitor $C_{A2}$.

According to various embodiments to be described hereinafter, at least one of the first auxiliary capacitor $C_{A1}$ and the second auxiliary capacitor $C_{A2}$ may be included, and the secondary circuit of the transformer, that is, the circuital structure of the rectifying portion may be partially different. However, the effects according to the embodiments may be substantially the same as those of the PSFB converter according to the embodiment.

Figure 6:
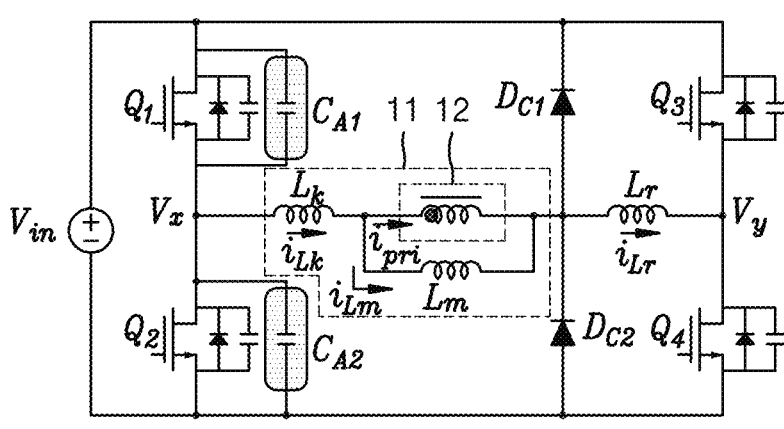
FIG. 6 is a circuit diagram of a PSFB converter according to another embodiment.
Figure 6:
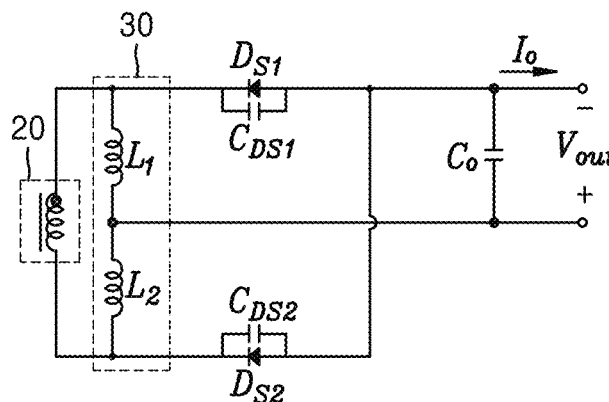

FIG. 6 is a circuit diagram of a PSFB converter according to another embodiment.

As illustrated in FIG. 6, except that the PSFB converter according to the another embodiment may include, in the primary portion 11 of the transformer, both of the first auxiliary capacitor $C_{A1}$ and the second auxiliary capacitor $C_{A2}$, the PSFB converter according to the another embodiment may have the same circuital structure of the primary portion 11 of the transformer as the PSFB converter according to the embodiment shown in FIG. 2, and may have a different secondary circuit of the transformer from the PSFB converter according to the embodiment shown in FIG. 2.

As illustrated in FIG. 6, the transformer may include the secondary-side coil 20, and the rectifying portion may include an inductor portion 30, a first diode $D_{S1}$, a second diode $D_{S2}$, and an output capacitor $C_O$.

The inductor portion 30 may be connected to the secondary-side coil 20 of the transformer in parallel and may include a first output inductor $L_1$ and a second output inductor $L_2$ connected to each other in series.

An end of the first diode $D_{S1}$ may be connected to an end of the first output inductor $L_1$. An end of the second diode $D_{S2}$ may be connected to the other end of the second output inductor $L_2$, and the other end of the second diode $D_{S2}$ may be connected to the other end of the first diode $D_{S1}$. The first diode $D_{S1}$ and the second diode $D_{S2}$ may allow currents to flow only from the secondary-side coil 20 of the transformer to an output end.

An end of the output capacitor $C_O$ may be connected to the other end of the first diode $D_{S1}$, and the other end of the output capacitor $C_O$ may be connected between the first output inductor $L_1$ and the second output inductor $L_2$.

Figure 7:
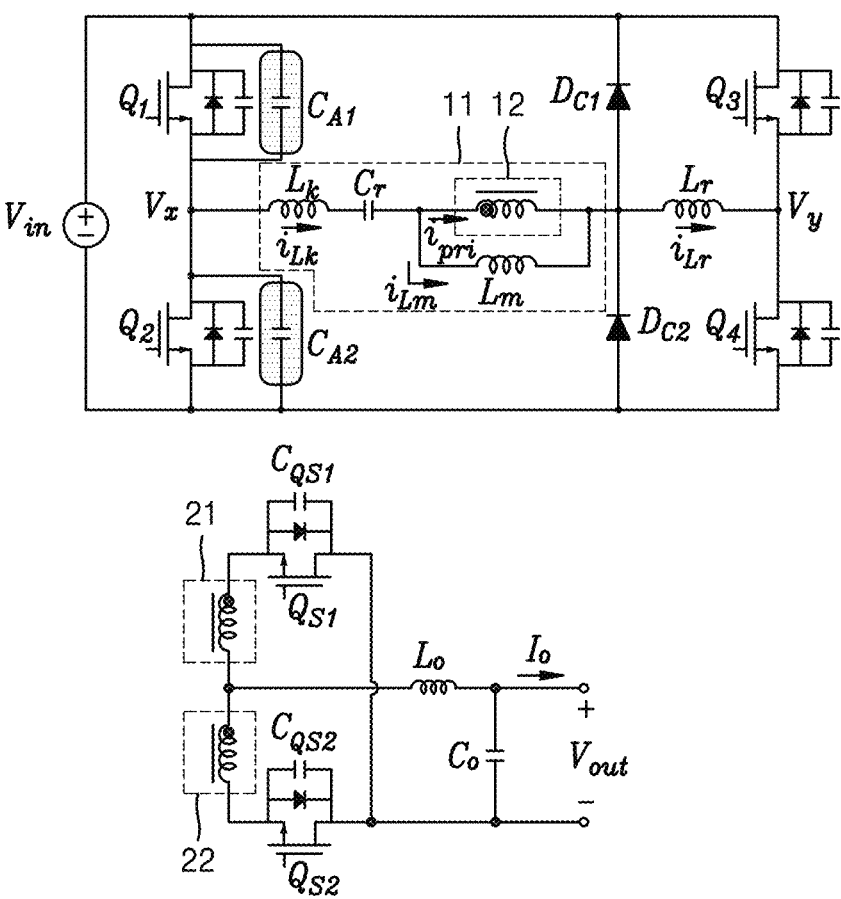
FIG. 7 is a circuit diagram of a PSFB converter according to another embodiment.

FIG. 7 is a circuit diagram of a PSFB converter according to another embodiment.

As illustrated in FIG. 7, except that the PSFB converter according to the another embodiment may include, in the primary portion 11 of the transformer, both of the first auxiliary capacitor $C_{A1}$ and the second auxiliary capacitor $C_{A2}$, and the resonance capacitor Cr may be arranged between the first inductor $L_k$ and the primary-side coil 12 of the transformer, the PSFB converter according to the another embodiment may have the same circuital structure of the primary portion 11 of the transformer as the PSFB converter according to the embodiment shown in FIG. 2, and may have a different secondary circuit of the transformer from the PSFB converter according to the embodiment shown in FIG. 2.

According to the present embodiment, the transformer may include the secondary-side first coil 21 and the secondary-side second coil 22 connected to each other in series, and the rectifying portion may include a first rectifying switch $Q_{S1}$, a second rectifying switch $Q_{S2}$, an output inductor $L_O$, and an output capacitor $C_O$.

An end of the first rectifying switch $Q_{S1}$ may be connected to an end of the secondary-side first coil 21.

An end of the second rectifying switch $Q_{S2}$ may be connected to the other end of the secondary-side second coil 22, and the other end of the second rectifying switch $Q_{S2}$ may be connected to the other end of the first rectifying switch $Q_{S1}$. That is, according to the present embodiment, unlike the other embodiments described above, the rectifying portion may include a switch, such as a metal oxide semiconductor field effect transistor (MOSFET), rather than a diode.

Each of the first rectifying switch $Q_{S1}$ and the second rectifying switch $Q_{S2}$ may include a diode and a parasitic capacitor connected to each other in parallel.

An end of the output inductor $L_O$ may be connected to a node between the secondary-side first coil 21 and the secondary-side second coil 22.

An end of the output capacitor $C_O$ may be connected to the other end of the output inductor $L_O$, and the other end of the output capacitor $C_O$ may be connected to the other end of the second rectifying switch $Q_{S2}$.

Figure 8:
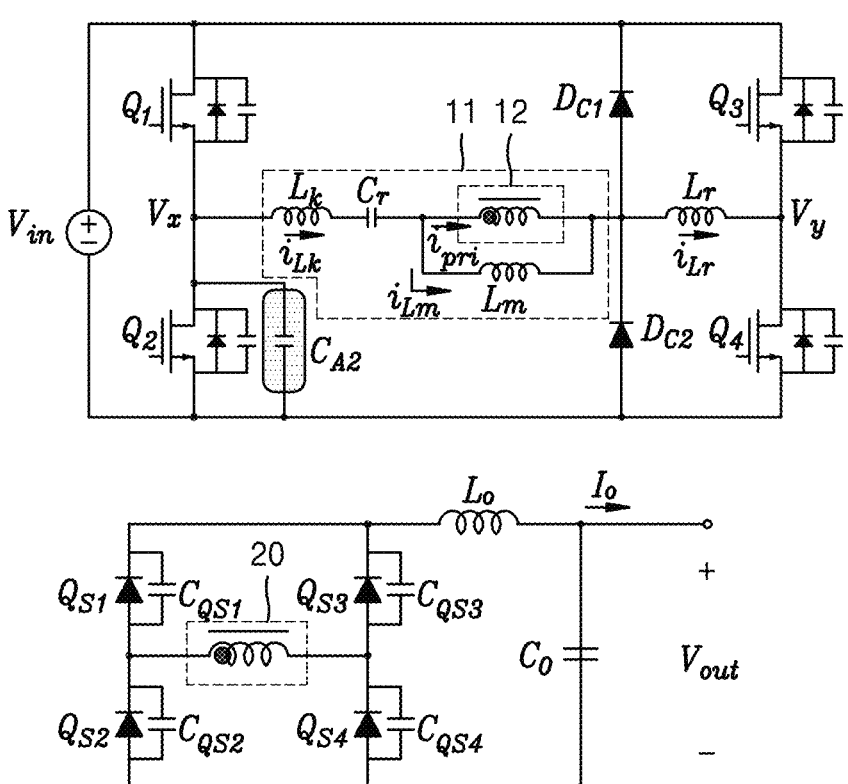
FIG. 8 is a circuit diagram of a PSFB converter according to another embodiment.

FIG. 8 is a circuit diagram of a PSFB converter according to another embodiment.

As illustrated in FIG. 8, except that the PSFB converter according to the another embodiment may include, in the primary portion 11 of the transformer, the second auxiliary capacitor $C_{A2}$, the PSFB converter according to the another embodiment may have the same circuital structure of the primary portion 11 of the transformer as the PSFB converter according to the another embodiment shown in FIG. 7, and may have a different circuit of the secondary portion of the transformer from the PSFB converter according to the another embodiment shown in FIG. 7. For example, the rectifying portion may include a first rectifying switch $Q_{S1}$ to a fourth rectifying switch $Q_{S4}$ arranged as a full bridge form, and the transformer may include the secondary-side coil 20 having an end connected between the first rectifying switch $Q_{S1}$ and the second rectifying switch $Q_{S2}$ and the other end connected between the third rectifying switch $Q_{S3}$ and the fourth rectifying switch $Q_{S4}$. Each of the third rectifying switch $Q_{S3}$ and the fourth rectifying switch $Q_{S4}$ may include a diode and a parasitic capacitor connected to each other in parallel.

The rectifying portion may further include an output inductor $L_O$ having an end connected to an end of the first rectifying switch $Q_{S1}$ and an end of the third rectifying switch $Q_{S3}$ and an output capacitor $C_O$ having an end connected to the other end of the output inductor $L_O$ and the other end connected to the other end of the second rectifying switch $Q_{S2}$ and the other end of the fourth rectifying switch $Q_{S4}$.

Figure 9:
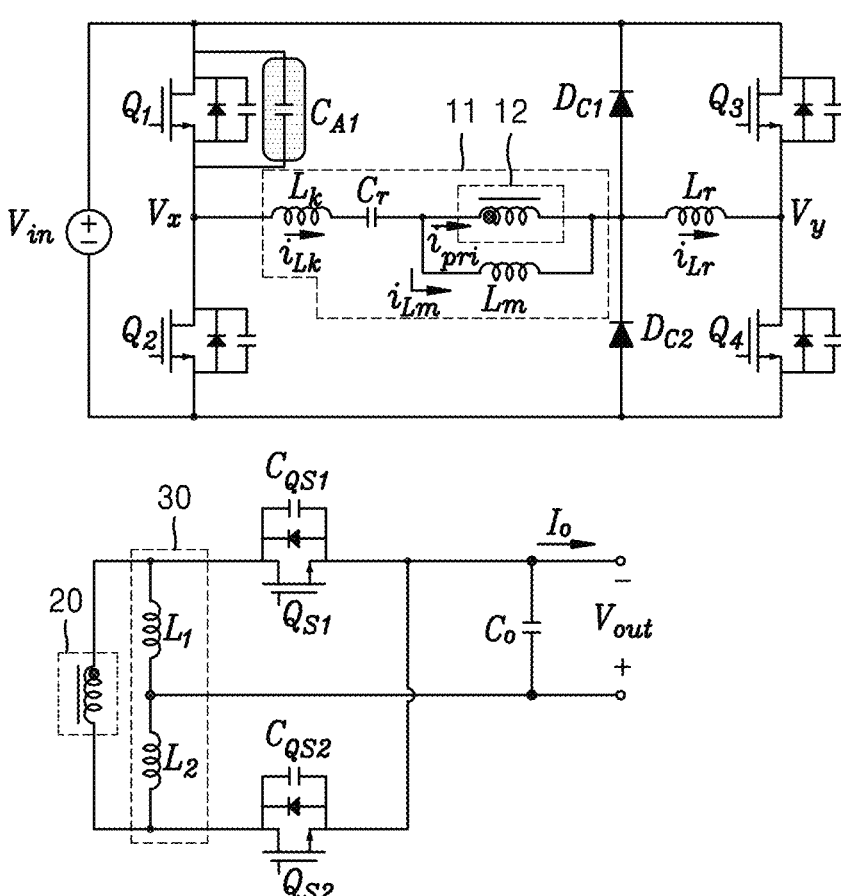
FIG. 9 is a circuit diagram of a PSFB converter according to another embodiment.

FIG. 9 is a circuit diagram of a PSFB converter according to another embodiment.

As illustrated in FIG. 9, except that the PSFB converter according to the another embodiment may include, in the primary portion 11 of the transformer, the first auxiliary capacitor $C_{A1}$, the PSFB converter according to the another embodiment may have the same circuital structure of the primary portion 11 of the transformer as the PSFB converter according to the another embodiment shown in FIG. 7, and may have a different circuit of the secondary portion of the transformer from the PSFB converter according to the another embodiment shown in FIG. 7.

For example, the transformer may include the secondary-side coil 20, and the rectifying portion may include the inductor portion 30 connected to the secondary-side coil 20 in parallel and including the first output inductor $L_1$ and the second output inductor $L_2$ connected to each other in series, the first rectifying switch $Q_{S1}$ having an end connected to an end of the first output inductor $L_1$, the second rectifying switch $Q_{S2}$ having an end connected to the other end of the second output inductor $L_2$ and the other end connected to the other end of the first rectifying switch $Q_{S1}$, and the output capacitor $C_O$ having an end connected to the other end of the first rectifying switch $Q_{S1}$ and the other end connected between the first output inductor $L_1$ and the second output inductor $L_2$.

As described above, according to the one or more of the above embodiments of the disclosure, the high-efficiency PSFB converter may have increased power efficiency by reducing the magnitude of currents flowing toward the clamp diode by using the auxiliary capacitor connected in parallel to the first switch or the second switch, which is connected to the primary portion of the transformer.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by one of ordinary skill in the art that various changes in form and details may be made therein without departing from the spirit and scope as defined by the following claims.

What is claimed is:

1. A phase shift full bridge (PSFB) converter comprising:
   a switch portion including first to fourth switches connected in a form of a full bridge, the switch portion being configured to receive a direct current input and output an alternating current output;
   a transformer configured to convert the output of the switch portion, an end of a primary portion of the transformer being connected to a node between the first switch and the second switch;
   a rectifying portion including at least one diode connected to an output end of the transformer, the rectifying portion being configured to rectify the output of the transformer;
   a resonance inductor having an end connected to another end of the primary portion of the transformer and another end connected to a node between the third switch and the fourth switch;
   a first clamp diode having an end connected to an end of the first switch and another end connected to the other end of the primary portion of the transformer;
   a second clamp diode having an end connected to the other end of the primary portion of the transformer and another end connected to another end of the second switch; and
   a first auxiliary capacitor connected to the first switch in parallel, wherein an end of the first auxiliary capacitor is connected to a plus end of a voltage source and the other end of the first auxiliary capacitor is connected to a node between the first switch and the second switch,
   wherein the first clamp diode and the second clamp diode suppress high peak voltage on the at least one of a diode of the output end of the transformer, and
   wherein the first auxiliary capacitor reduces the current flowing into the first clamp diode and the second clamp diode when both of the first and second switches are turned on or off by preventing rapid current fluctuations in the primary portion resulting from turn-on or turn-off operation of the first and second switches.

2. The PSFB converter of claim 1,
   wherein the transformer includes a secondary-side first coil and a secondary-side second coil, and
   the rectifying portion includes:
   a first diode having an end connected to an end of the secondary-side first coil;

a second diode having an end connected to another end of the secondary-side second coil and another end connected to another end of the first diode;

an output inductor having an end connected between the secondary-side first coil and the secondary-side second coil; and an output capacitor having an end connected to another end of the output inductor and another end connected to another end of the second diode.

3. The PSFB converter of claim 1, further comprising the first auxiliary capacitor and a second auxiliary capacitor, wherein the transformer includes a secondary-side coil, and the rectifying portion includes:

an inductor portion connected to the secondary-side coil in parallel and including a first output inductor and a second output inductor connected to each other in series;

a first diode having an end connected to an end of the first output inductor;

a second diode having an end connected to another end of the second output inductor and another end connected to another end of the first diode; and an output capacitor having an end connected to the other end of the first diode and another end connected between the first output inductor and the second output inductor.

\* \* \* \* \*